United States Patent [19]

Koppensteiner et al.

[11] Patent Number: 4,690,356

[45] Date of Patent: Sep. 1, 1987

[54] WIRE FORMED CABLE BRACKETS

[75] Inventors: James V. Koppensteiner, Chicago; Charles K. Kubik, Brookfield, both of Ill.

[73] Assignee: GTE Communication Systems Corporation, Northlake, Ill.

[21] Appl. No.: 814,702

[22] Filed: Dec. 30, 1985

[51] Int. Cl.[4] .............................................. F16L 3/22
[52] U.S. Cl. .................................... 248/68.1; 248/302
[58] Field of Search ................. 248/68.1, 69, 62, 65, 248/58, 74.1, 302, 49, 70, 71, 72, 74.3

[56] References Cited

U.S. PATENT DOCUMENTS

| | | | |
|---|---|---|---|
| 1,522,286 | 1/1925 | Clausen | 248/302 X |
| 1,818,659 | 8/1931 | Tournier | 248/68.1 |
| 2,332,855 | 10/1943 | Jones | 248/72 |
| 2,450,147 | 9/1948 | Lawry | 248/72 X |
| 2,840,692 | 6/1958 | Stiffel | 248/302 X |
| 3,288,414 | 11/1966 | Fortunato | 248/302 X |

Primary Examiner—J. Franklin Foss
Attorney, Agent, or Firm—Robert J. Black; Gregory G. Hendricks

[57] ABSTRACT

Cable brackets are formed out of wire and have flat areas swaged into them to provide suitable mounting surfaces. The wire is of sufficient diameter to provide structural rigidity to the bracket and the flattened areas are of such dimension to provide an area sufficiently large enough for a mounting hole.

1 Claim, 3 Drawing Figures

WIRE FORMED CABLE BRACKETS

FIELD OF THE INVENTION

The present invention relates to cable brackets and more particularly to such brackets which are formed out of wire and include flattened areas swaged into them.

BACKGROUND OF THE INVENTION

Typically, cable brackets are fabricated out of flat steel stock. Such brackets are heavy, costly and require a different gage and width of steel for each different bracket. Consequently, blanking dies, resulting in high tooling costs, are required for such flat steel stock brackets. Thus, flat steel stock brackets are not suitable when weight, cost and tooling are factors.

SUMMARY OF THE INVENTION

In accordance with the present invention, a bracket is provided for use in an environment including cables and a supporting structure. This bracket is formed into a shape that at least partially encloses a plurality of cables. The bracket includes at least one flattened area formed by swaging, and the flattened area includes a hole for mounting the bracket to a supporting structure.

DESCRIPTION OF THE PREFERRED EMBODIMENT

Wire formed cable brackets have certain characteristics which enable them to be more suitable than flat steel stock brackets. These wire formed cable brackets are made from wire which is of such a diameter as to provide structural rigidity to the brackets. Also, since wire is lighter and stronger than flat steel stock, these wire formed cable brackets are lighter and stronger than flat steel stock brackets. In addition, these wire formed cable brackets can be formed without costly blanking dies. Since many bracket configurations can be formed from wire of a single diameter, utilization of wire formed cable brackets eliminates the need to stock a variety of gages and widths of flat steel stock brackets.

Figure 1:
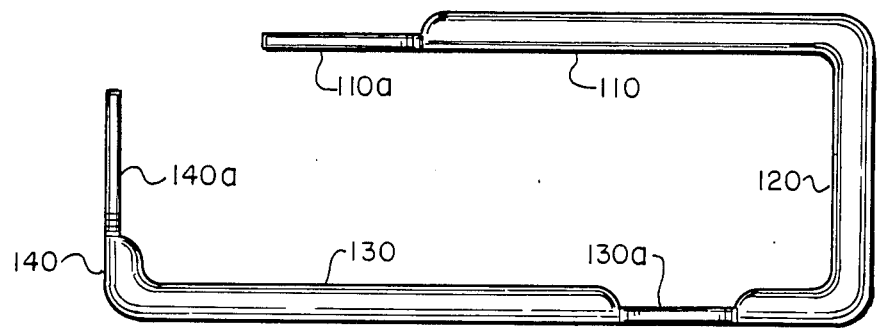
FIG. 1 of the accompanying drawing is a front view of a cable bracket in accordance with the present invention.

Referring now to FIG. 1, a front view of wire formed cable bracket in accordance with the present invention is shown. This bracket includes upper horizontal member 110, right vertical member 120, lower horizontal member 130, and left vertical member 140. Upper horizontal member 110 includes a swaged flat area 110a, lower horizontal member 130 includes swaged flat area 130a, and left vertical member 140 includes swaged flat area 140a. Obviously swaged flat areas could be implemented in wire formed cable brackets wherever needed for a particular application.

Figure 2:
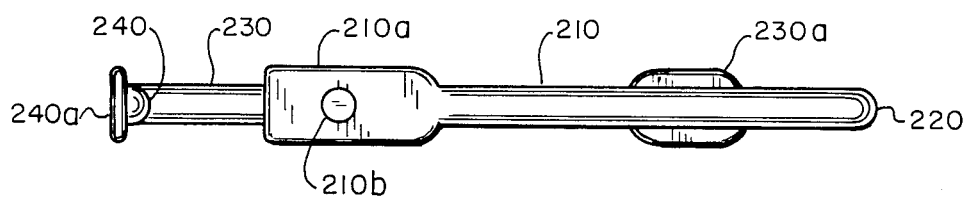
FIG. 2 of the accompanying drawing is a top view of the cable bracket of FIG. 1.

Referring now to FIG. 2, a top view of the wire formed cable of FIG. 1 is shown. This view shows upper horizontal member 210, right vertical member 220, lower horizontal member 230 and left vertical member 240. Upper horizontal member 210 includes swaged flat area 210a. This swaged flat area includes mounting hole 210b. Lower horizontal member 230 incudes swaged flat area 230a and left vertical member 240 includes swaged fat area 240a.

Figure 3:
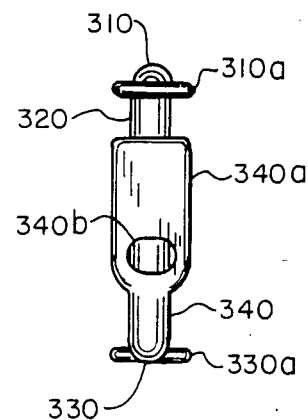
FIG. 3 of the accompanying drawing is a left side view of the cable bracket of FIG. 1.

Referring now to FIG. 3 a left side view of the wire formed cable bracket of FIG. 1 is shown. This view shows left vertical member 340 which includes swaged flat area 340a. This swaged flat area includes mounting hole 340b. Lower horizontal member 330 and right vertical member 320 are also shown, as is upper horizontal member 310 which includes swaged flat area 310a.

Thus, through utilization of the wire formed cable brackets of the present invention, brackets which are lighter and stronger than flat steel stock brackets can be utilized without the high cost of blanking dies. Also, through utilization of a single diameter wire, for example 0.25 inch diameter wire, a variety of wire formed cable brackets can be implemented from a single diameter wire rather than requiring different gages and widths of flat steel stock as is necessary for flat steel stock brackets. Through utilization of 0.25 inch diameter wire, brackets are formed which would typically include 0.50 inch swaged flat areas and those swaged flat areas would typically include 0.218 inch diameter mounting holes.

It will be obvious to those skilled in the art that numerous modifications of the present invention can be made without departing from the spirit of the invention which shall be limited only by the scope of the claims appended hereto.

What is claimed is:

1. A bracket for use in an environment including cables and a supporting structure,
    said bracket comprising a flexible material formed into an enclosure through which cables are inserted, whereby said flexible bracket causes said cables to be grouped together;
    said bracket formed from wire, at least partially enclosing a plurality of cables, and including an upper horizontal member, including at least a first area of swaged construction, said flattened area including a first hole for mounting said bracket to a supporting structure;
    a left vertical member;
    a lower horizontal member, including a second flattened area of swaged construction; and
    a left vertical member, including a third flattened area of swaged construction, said third flattened area including a hole for mounting said bracket to a supporting structure.

* * * * *